United States Patent [19]

Mathauser

[11] Patent Number: 4,632,225
[45] Date of Patent: Dec. 30, 1986

[54] BRAKE DEVICE FOR BICYCLES

[76] Inventor: William R. Mathauser, 3000 "B" Ave., Anacortes, Wash. 98221

[21] Appl. No.: 731,737

[22] Filed: May 8, 1985

[51] Int. Cl.[4] ............................................. B62L 1/14
[52] U.S. Cl. .............................. 188/24.18; 188/24.19; 188/72.6; 188/344
[58] Field of Search ............... 188/24.18, 24.19, 24.22, 188/72.5, 72.6, 344

[56] References Cited

U.S. PATENT DOCUMENTS

| 2,699,228 | 1/1955 | Mennesson | 188/24.19 |
| 3,185,263 | 5/1965 | Schanz et al. | 188/72.6 X |
| 3,432,009 | 3/1969 | Bricker | 188/72.6 X |
| 3,776,333 | 12/1973 | Mathauser | 188/24.19 X |
| 4,027,746 | 6/1977 | Kine | 188/24.19 |

FOREIGN PATENT DOCUMENTS

| 0052077 | 4/1977 | Japan | 188/344 |
| 1239805 | 7/1971 | United Kingdom | 188/344 |

Primary Examiner—Duane A. Reger
Attorney, Agent, or Firm—Shoemaker and Mattare, Ltd.

[57] ABSTRACT

A braking device for bicycles and the like comprising a double pair of yoke elements stamped of sheet plate material having appropriate lightening holes and component element mounting holes provided therewith. A pair of suitably mounted brake pad structures are adjustably mounted from slots in the main body portion of the respective pairs of yoke plates. One of said brake pads can be mounted on a suitable hydraulically actuated slave unit and/or the other operator controlled brake actuation mechanism. The other brake pad is mounted on a slidable movable shaft which is spring biased in the released or non-actuated position. An off-center cam lever moves the parking brake pad into actuated position with a bicycle wheel, or disengages same therefrom. An off-center cam structure mounted adjacent the pivot point of the pairs of yoke plates provides for a wide open, quick release operation of the overall device to permit removal of a brake wheel and tire without other modification or disassembly of the braking device.

19 Claims, 16 Drawing Figures

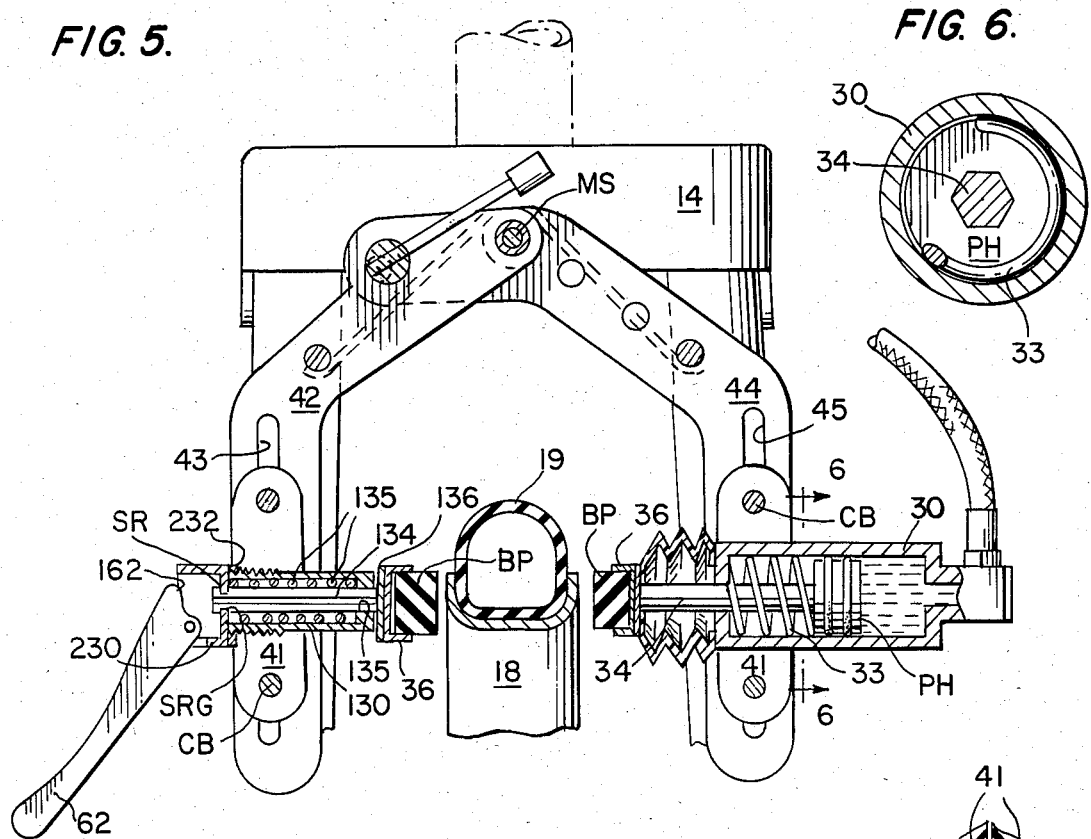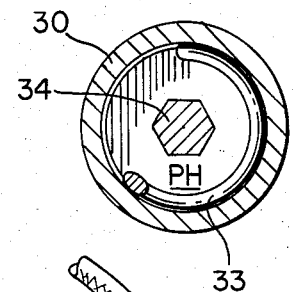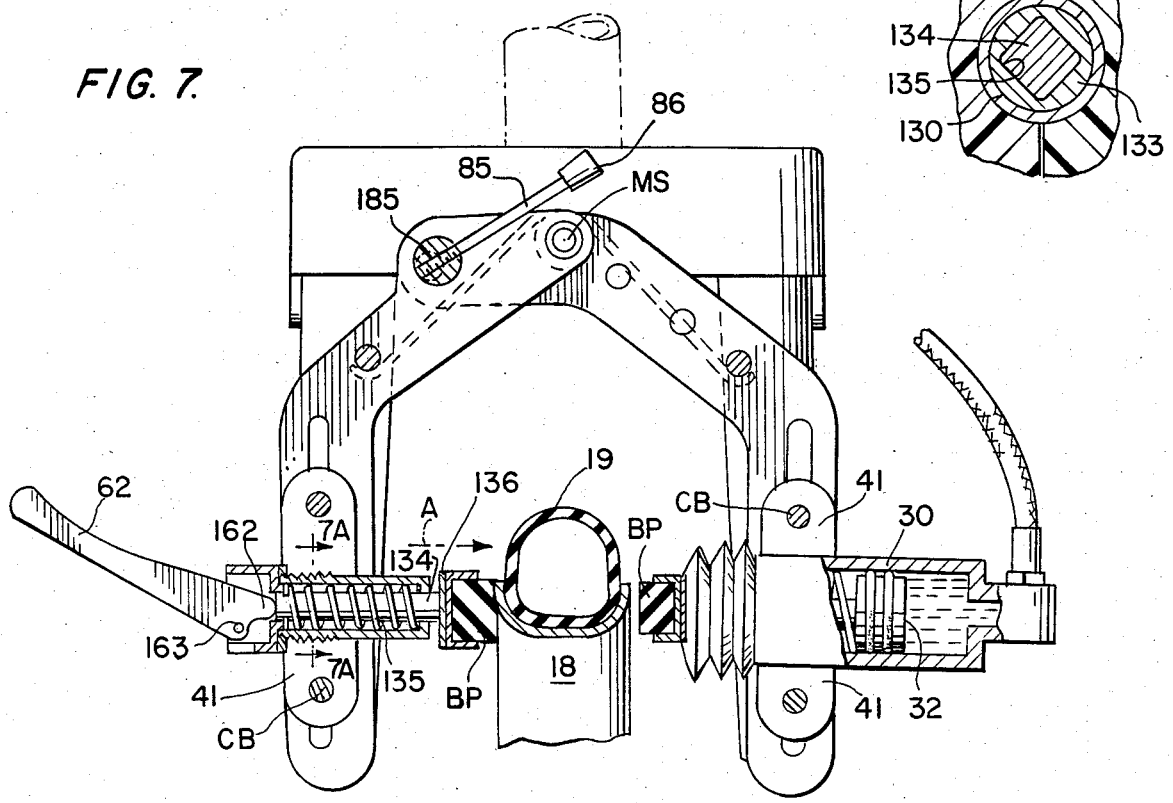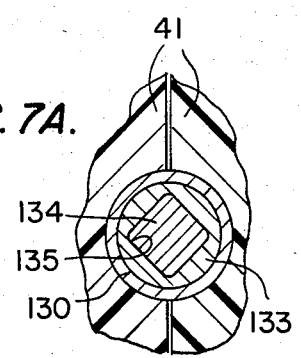

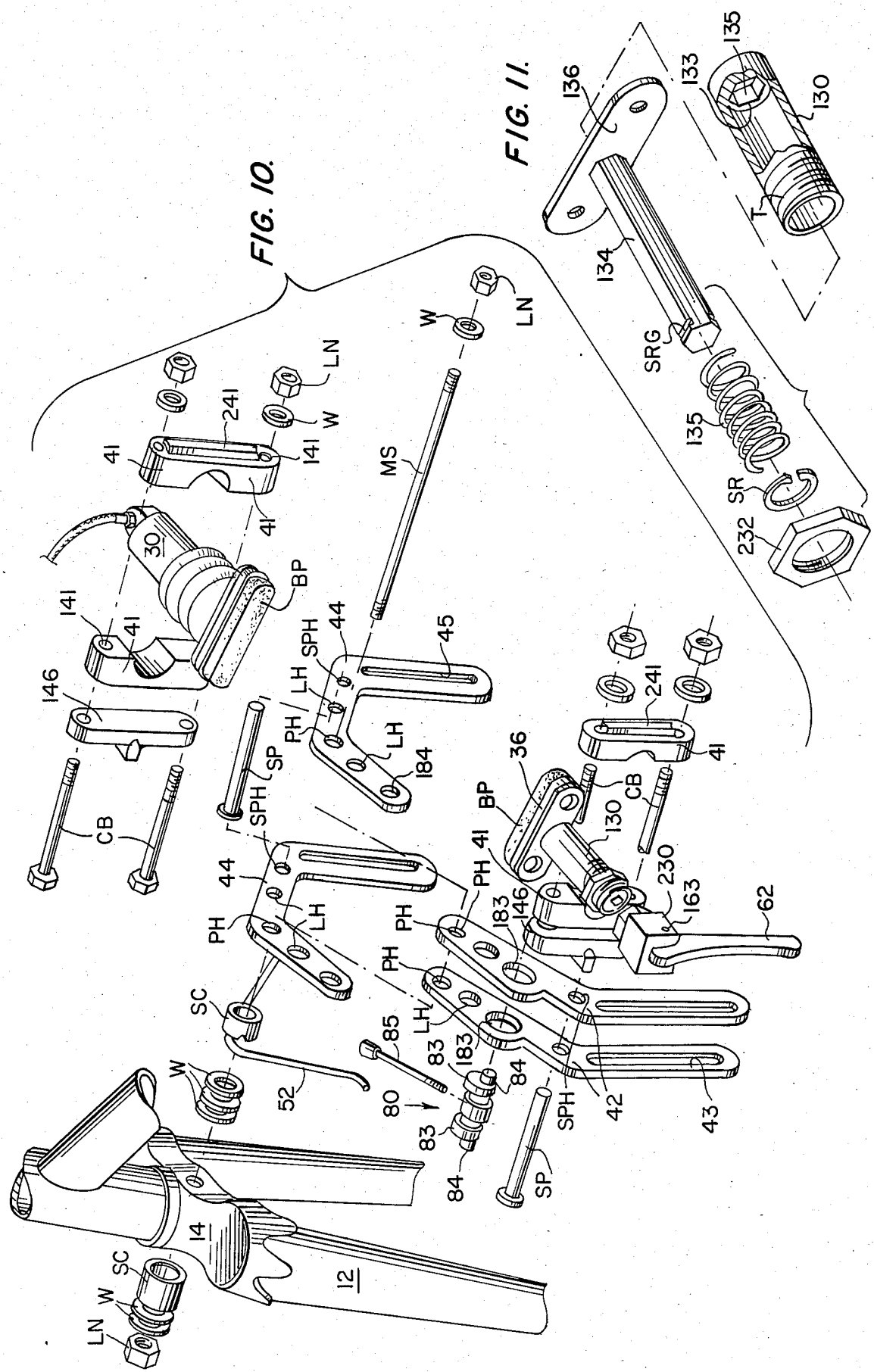

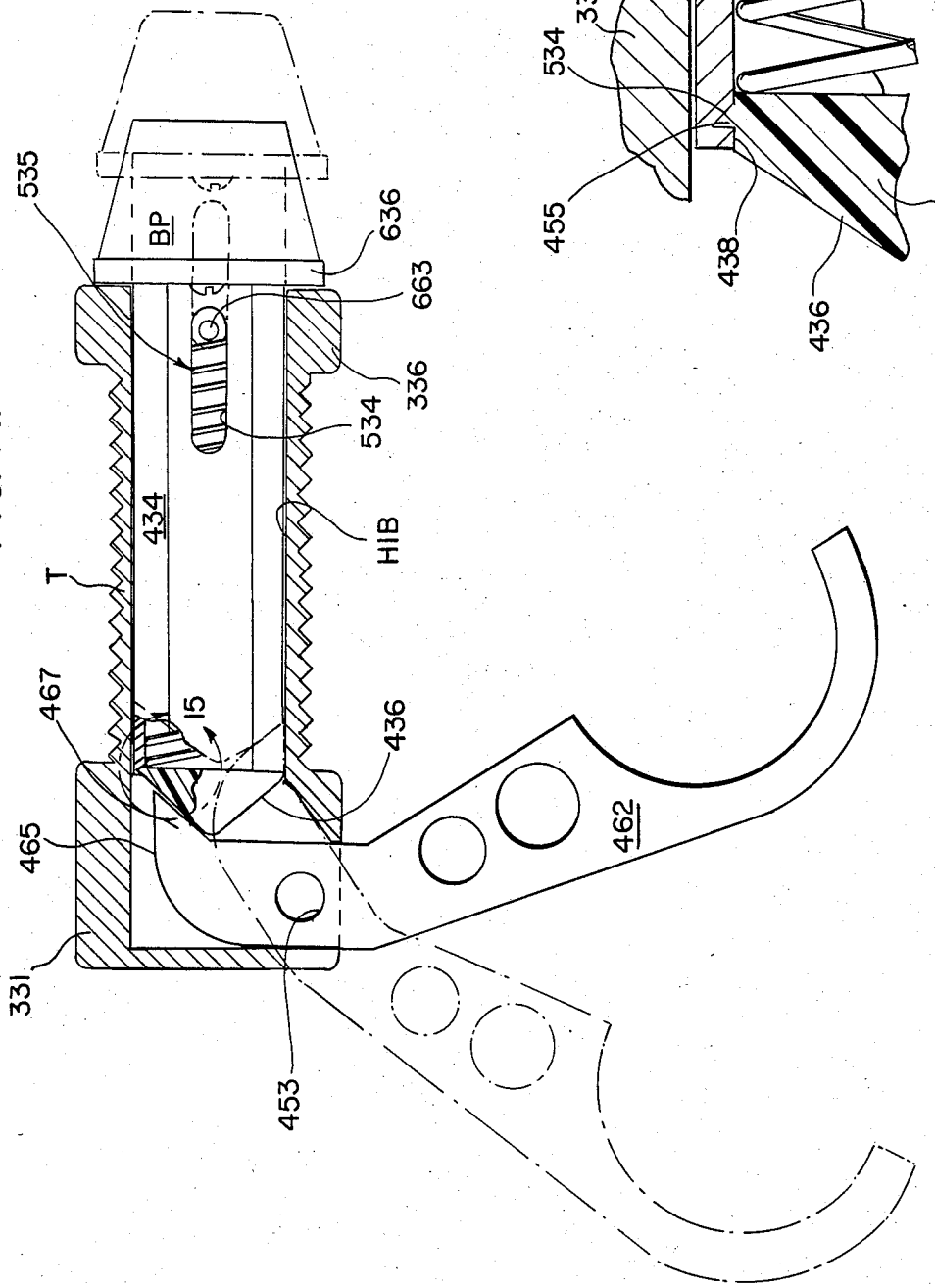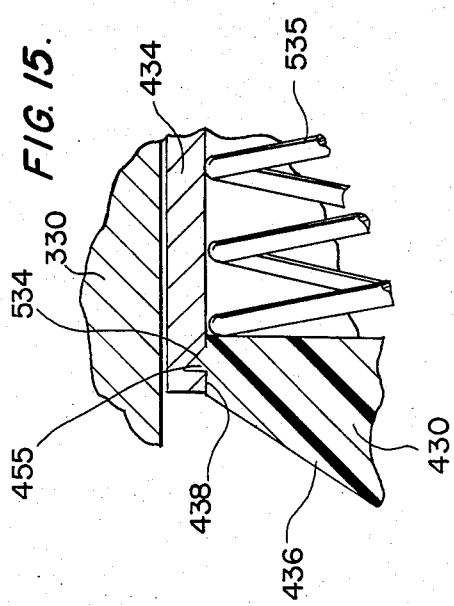

BRAKE DEVICE FOR BICYCLES

BACKGROUND OF THE INVENTION

1. Field of the Invention

The present invention relates generally to brake devices for bicycles, and, more specifically, to brake structure comprising a pivotally mounted and open brake structure of plate material including an opened wide release mechanism together with parking brake structure.

2. Description of the Prior Art

Most of the brake devices for bicycles of present design utilize yoke construction having cast or formed yoke pieces for holding and actuating suitable brake pads upon the respective wheels of the bicycle. It is highly desirable that yoke structure of more simplified design and reduced cost for both the material and the time of making and manufacturing be employed.

In addition, it is a great advantage if the yoke structure can be opened wider than the normal non-actuated position, the reason being that whenever a tire size exceeds the cross-section of the rim dimension, which is the case on virtually all bicycles except the extreme purist type and racing bicycles, the ability to open the brake yokes wider than normal to allow the passage of the tire, since it is larger than the rim, is most desirable. The conventional type brake on the market today opens just enough in most cases, or at least a good many cases, to allow the reasonable passage of the tire through the brake blocks when dismantling. However, in many cases even then the tire must be deflated in order to allow such passage. It is highly desirable that yoke structure which can open wider than normal when desired be employed. Also, quite commonly with conventional type brake structures, the weight thereof is quite high. Reduction of such weight can be very important, and also yoke structure which can utilize conventional and standard, off-the-shelf hardware items for saving in costs is highly desirable. Furthermore, space can oftentimes be critical, and a construction which will take up less space is, again, a great advantage. Another great disadvantage of known type bicycle brake structures is that they do not permit use thereof during parking. A parking brake just like an emergency brake and/or parking brake on an automobile is highly desirable for bicycles. However, such brake structure should be very convenient and easy to use.

Various attempts have been made by prior art devices to solve the above-listed problems; however, none of them offers the new and novel features of the present invention.

SUMMARY OF THE INVENTION

An object of the present invention is to provide a simplified and versatile yoke structure for a bicycle brake.

Another object of the present invention is to provide a yoke structure of sheet stock which basically can be formed as a single unit, with multiple units being employed for the overall yoke structure. Use of sheet stock for forming same greatly reduces the weight and problems of manufacture thereof.

A further object of this invention is to provide an improved yoke structure having a release mechanism therewith for permitting wider than normal opening thereof, this being used to allow removal of a bicycle wheel from a bicycle frame without requiring any disassembly of the braking device.

A still further object of the present invention is to provide a quick release mechanism for yoke structure of sheet plate material which permits the yoke structure to be opened wider than normal. An over-center cam structure is employed for effecting such wide open movement.

Another further object of the present invention is to provide a parking brake structure together with an improved brake unit for permitting braking of the bicycle when stopped and unattended.

Another still further object of the present invention is to provide an over-center lever together with a brake pad mounted on a plunger for braking a bicycle wheel when in a stopped position.

The present invention has a number of new and novel features. Among them is the use of a single unit stamped from sheet plate material which can be used for all four parts of the overall brake yoke structure. Conventional type brake yokes are formed or cast and are relatively expensive, as well as requiring quite a bit of time to manufacture. By using the improved yoke of the present invention stamped from sheet stock, the overall cost as well as time in making are both greatly reduced. A single piece of specially configured yoke structure can be provided with lightening holes, pivot bolt mounting holes, and brake pad holding and actuating structure for use with pad units.

Another very important feature of the present invention is a quick release mechanism for opening the assembled yoke structure wider than normal. Such wide open release mechanism allows a wheel with an oversized tire and/or deflated tire to be removed from the bicycle without any modification or disassembly of the braking structure. An eccentric and off-center cam with lever is utilized together with mounting holes as provided in the sheet stock yoke structure to effect the desired quick release, wide open movement.

Another very important feature of the present invention is the provision of a lever operated brake structure for parking use. By movement of the lever in one direction, the brake pad mounted on the slidable plunger is released and in the normal position for conventional type braking action, but when the lever is thrown in the opposite direction, the brake pad is moved against spring biasing means to effect a parking brake action of the overall brake structure.

All of the components of the improved brake device of the present invention are easily assembled and disassembled, and many conventional type off-the-shelf components can be utilized therewith. Again, this would effect a reduction in cost as well as savings in time.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 5 is a cross-sectional view taken generally along line 5—5 of FIG. 3 showing the parking brake in the non-actuated position.

FIG. 6 is a cross-sectional view taken generally along line 6—6 of FIG. 5.

FIG. 7 is a cross-sectional view like FIG. 5, but with the parking brake moved to the actuated position.

FIG. 7A is a cross-sectional view taken generally along line 7A—7A of FIG. 7.

FIG. 10 is an exploded perspective of the component elements of the braking device of the present invention.

FIG. 11 is an exploded perspective view of the parking brake pad assembly.

FIG. 14 is a side elevational view, partly in cross-section, of the parking brake of FIG. 13 taken generally along line 14—14 of FIG. 13.

FIG. 15 is an enlarged fragmentary portion of FIG. 14 along the encircled portion indicated by 15 in FIG. 15.

DESCRIPTION OF THE PREFERRED EMBODIMENT

Figure 1:
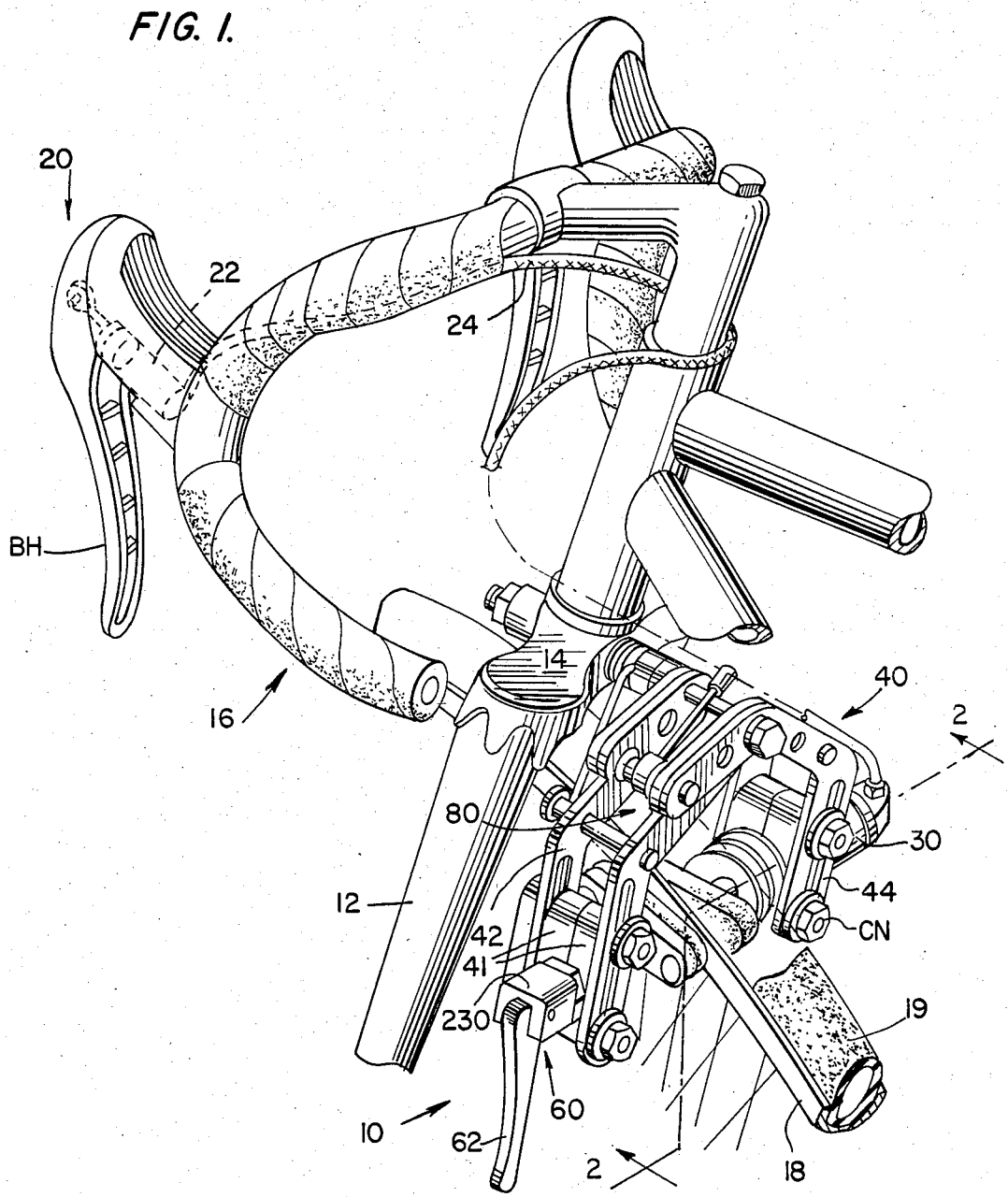
FIG. 1 is a perspective view of the new and improved braking device of the present invention.

Referring to FIG. 1 of the drawings, reference numeral 10 indicates in general the invention of the present application. The yoke structure made of plate or sheet stock material is indicated generally by reference numeral 40, the parking brake actuator structure is indicated generally by reference numeral 60, and the quick release wider than normal yoke opening mechanism is indicated in general by reference numeral 80.

Looking at the various figures of the drawings, and especially the exploded perspective of FIG. 10, the yoke structure of sheet stock will be described first. The right side yoke structure as viewed in the various figures is made of a pair of specially configured plates 44. Each plate 44 has a longitudinal slot 45 extending through the respective straight legs thereof. At the junction between the main body and the other leg of each yoke element is a pivot hole PH. These pivot holes PH permit the pair of yoke plates 44 to be mounted on the main support shaft MS which is appropriately fixed to the bicycle. Lightening holes LH are also provided as shown to decrease the the overall weight of the yoke elements. At the end of each of the other legs apertures 184 are provided. These apertures receive the ends 84 of the quick release cam element therewithin. Near the junction of the main body and the first leg of each yoke element a hole SPH for receiving the spring pin SP is provided.

Figure 4:
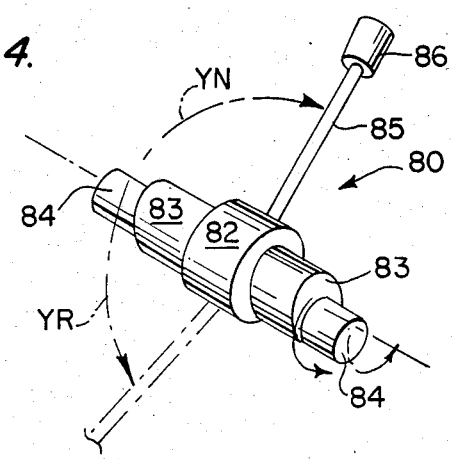
FIG. 4 is a perspective view of the release mechanism cam structure per se.
Figure 3:
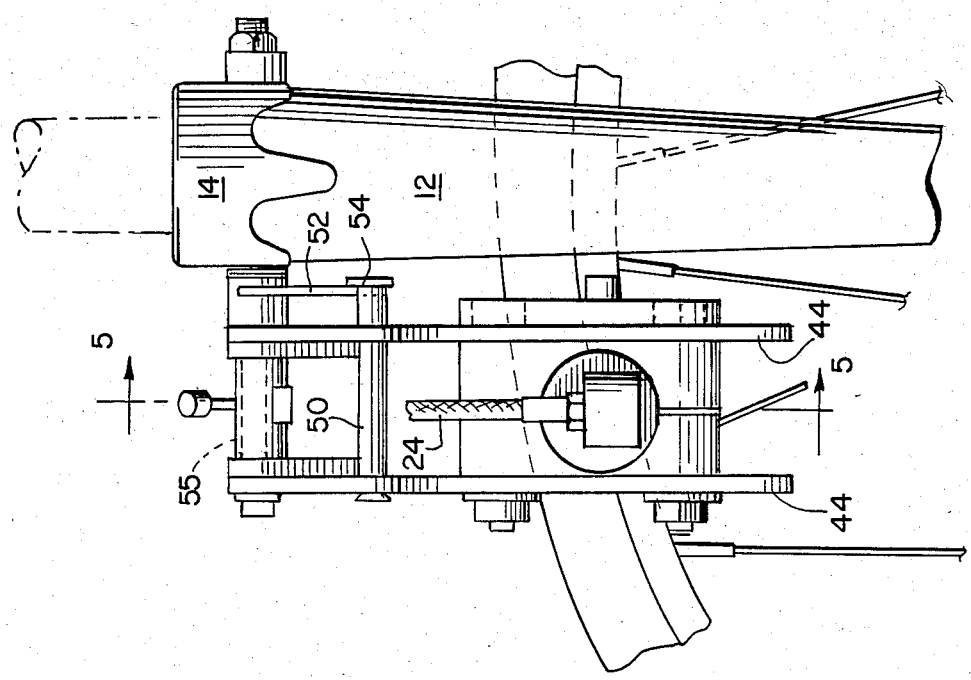
FIG. 3 is a side elevational view looking from the right of FIG. 2.
Figure 2:
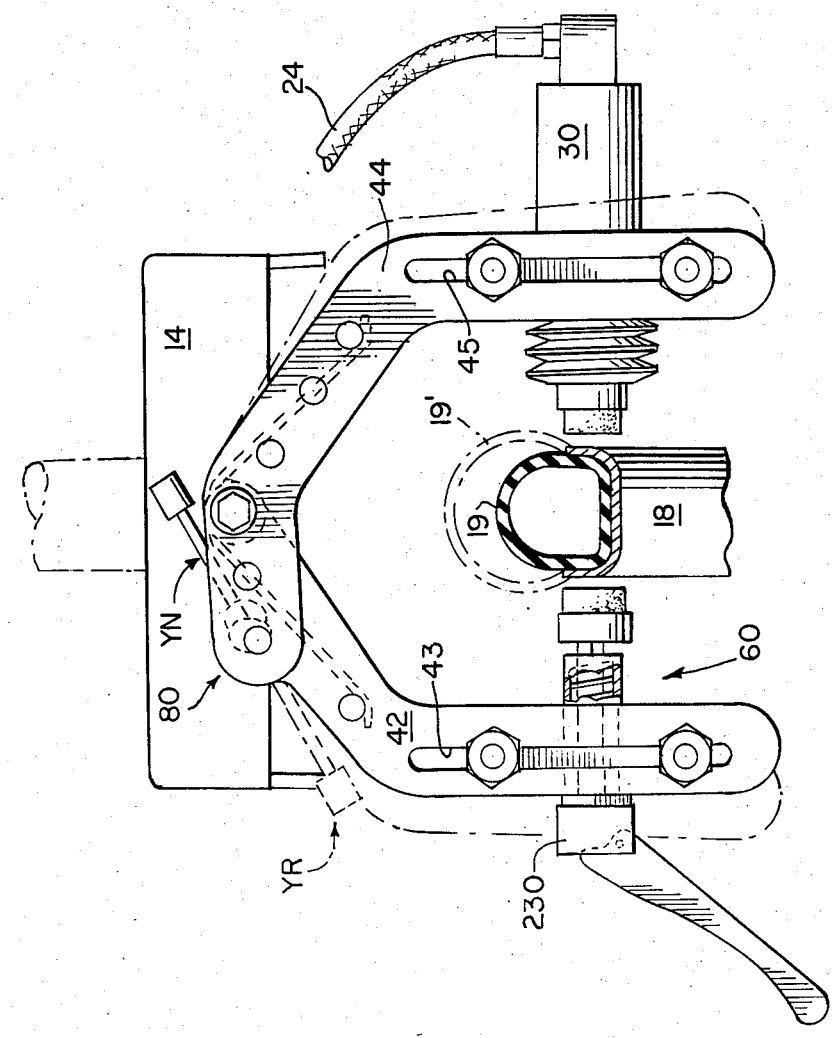
FIG. 2 is a rear elevational view of the brake device as mounted behind the front fork of a bicycle.

The other pair of yoke elements for the left side of the overall caliper structure comprise a pair of plates 42 of sheet stock. Each of these plates 42 has an elongated slot 43 therein for holding the brake pad unit for this side. At the junction between this leg and the body portion spring pin holes SPH are provided. Again, these holes receive a spring pin SP for engagement by the bias spring 52 which with the assembled device maintains the caliper assembly in normally open position. At the junction of the body and the second leg of each yoke element 42 is provided an oval opening 183 for reception of the cams 83 of the quick release structure 80. This cam structure, best seen in enlarged detail in FIG. 4, is provided with a central body 82 having a handle 85 appropriately affixed thereto. Handle 85 preferably is provided with an enlarged tip 86 for ease in grasping and operating same. As seen in FIG. 4, the yoke normal position is indicated in solid lines while the yoke release position of this structure is indicated by YR in dotted lines. FIGS. 2 and 3 show the yoke assembly in solid lines in the yoke normal position YN. As thus shown, if the tire 19 is oversized or of the balloon tire type as shown in dotted lines, and/or deflated, the wheel with tire 19/19' can obviously be more easily removed.

Thus, the quick release yoke mechanism of the present invention adds a very important feature to the plurality of yoke elements of sheet stock. Also, by making the respective yoke elements of flat plate sheet stock, ease of fabrication is substantially increased and the cost thereof is substantially reduced. Furthermore, this improved yoke structure can be used with off-the-shelf type component units for the overall brake structure, again substantially decreasing costs, and making repair and maintenance much easier.

The parking brake mechanism is indicated by reference numeral 60 and is best seen in FIGS. 5-8 and 11, instead of a hydraulic or other mechanically actuated brake unit as shown on the right side of these figures. On the left side, rather than having a stationary holder for the brake pad BP and shoe 36, a parking brake structure is provided. This parking brake structure comprises a cylinder 130 which is mounted between the support pads 41 and the yoke plates 42 in much the same manner as the active brake element on the right side. The right side unit as depicted comprises a hydraulic slave cylinder 30 having a piston 32 therewithin for actuating the piston rod 34 against the bias of spring 33. Thus, when piston rod 34 is moved to the left as shown in FIG. 5 by hydraulic pressure, the brake pad BP and shoe 36 will correspondingly also move to the left. As depicted in the exploded perspective of FIG. 11, the parking brake structure comprises a plate 136 which can be appropriately attached to the brake shoe 36 or brake pad BP by appropriate attaching screws. Housing 130 is provided with a single cylindrical bore substantially therethrough and a flange portion 133 at one end thereof. An opening of hexagonal shape 135 is provided through this flange area. This receives the hexagonal shaft 134 slidably therethrough and prevents turning of said shaft and thus turning of the brake pad after initial adjustment thereof. A spring 135 is in slight compression between the flange or shoulder 133 and the snap ring SR which fits in appropriate snap ring grooves SRG at the tip end of shaft 134. Thus, as can be easily visualized, the spring 135 maintains the parking brake in disengaged position until such time as the lever 62 for the parking brake is moved from the non-actuated position as shown in most of the views to the actuated position as depicted in FIG. 6. In FIG. 6 the cam tip 162 of the lever is shown moving the end of shaft 134 to engage the parking brake.

Figure 8:
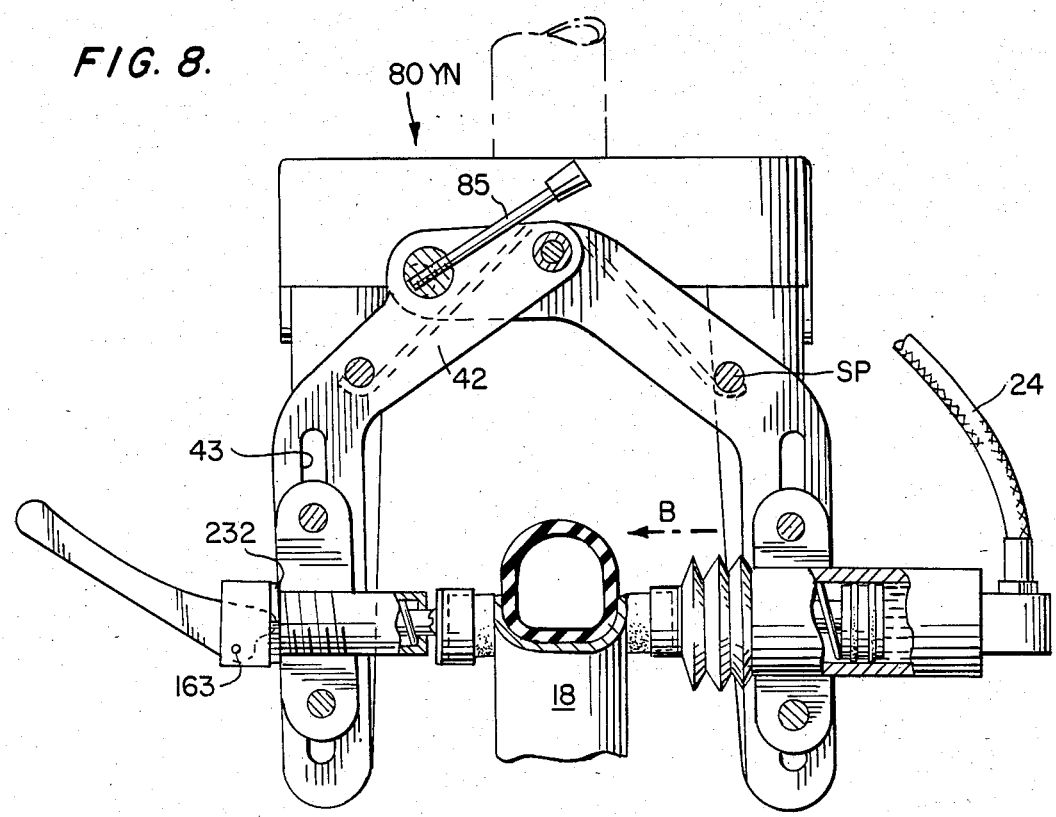
FIG. 8 is a view like FIG. 5 showing the parking brake in fully actuated position.
Figure 9:
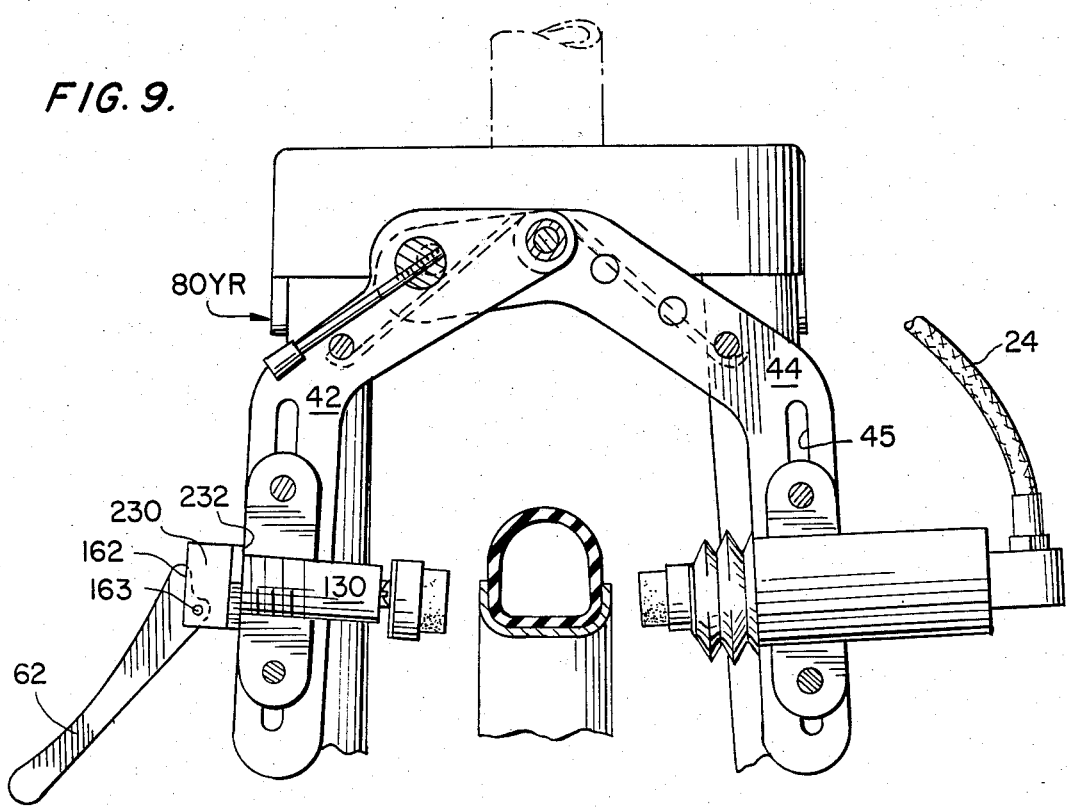
FIG. 9 is a view like FIG. 2 with the quick release cam structure thrown to the release wide open position of the yoke plates.
Figure 12:
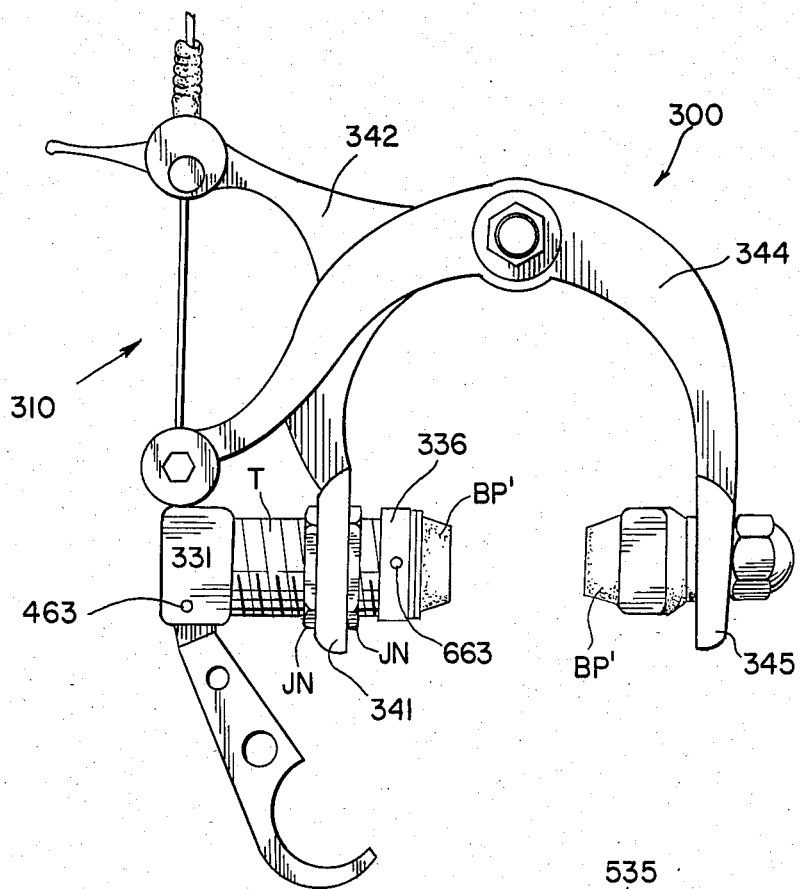
FIG. 12 is an elevational view of a modified embodiment of the parking brake of the present invention.
Figure 13:
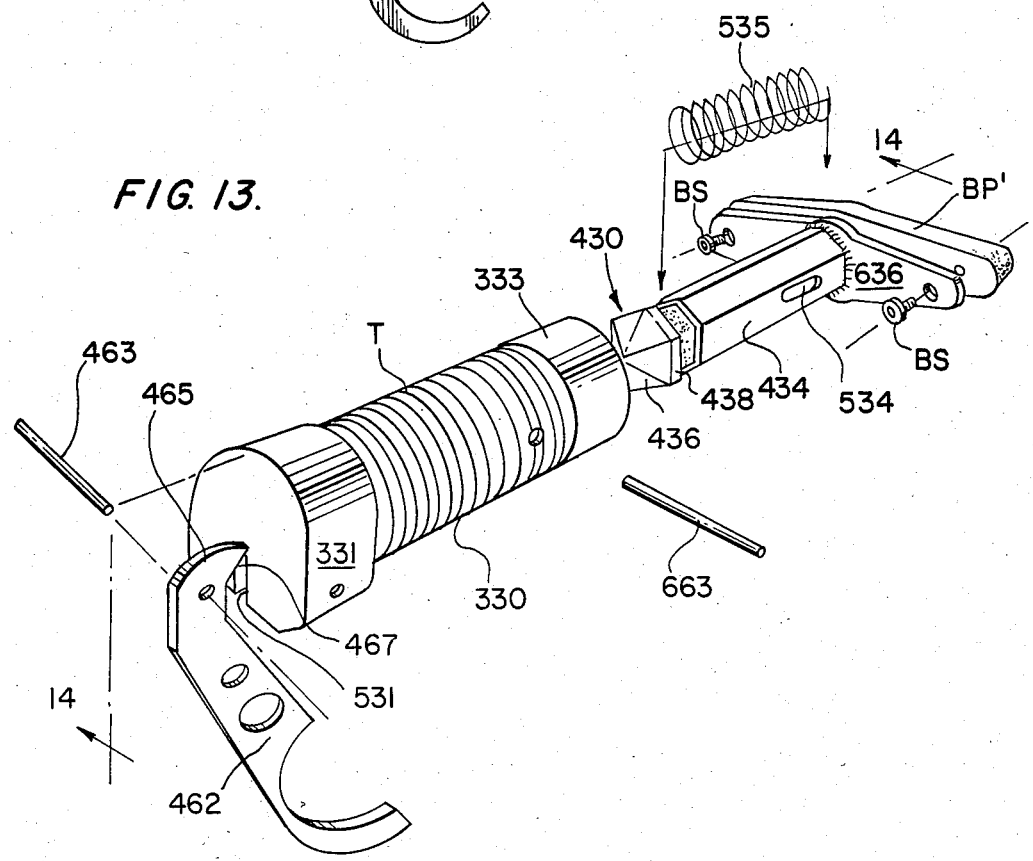
FIG. 13 is an exploded perspective of the parking brake mechanism per se.

The operation of the parking brake will now be described in detail. In FIG. 5 the brakes for parking and active bicycle braking are both non-actuated. In FIG. 6 the parking lever 62 has been thrown to the actuated position for the parking brake, thus moving shaft 134 to the right against the bias of spring 135. This movement in FIG. 6 is indicated by LA. As seen in this figure, the active brake structure to the right, which is in the non-actuated position, still has not quite engaged the bicycle wheel 18 and only the parking brake on the left has made contact. When complete engagement of the parking brake is made, the overall yoke structure pivots about the main shaft MS to effect total movement of the entire caliper structure. As this occurs, the active braking structure on the right moves in direction B of FIG. 8, and this in turn engages the wheel 18 to effectively cause both of the passive and active brake pads to firmly contact and engage either side of the wheel. Thus, as can be easily visualized, a very safe and permanent parking brake structure is provided by this portion of the invention. As shown in FIG. 8, the quick release structure 80 for the yoke plates is in the normal position. However, in FIG. 9 the quick release mechanism is open, and even though in this view the parking brake is shown unactuated, the opening normally will be sufficiently wide that even if it were to be closed, it would still permit removal of the bicycle wheel.

As shown in the exploded perspective of FIG. 10, the active slave cylinder 30 can be mounted between the pads 41 which are in turn supported between the respective yoke plates 44. As shown the pad 41 to the right in FIG. 10 has a rib 241 extending therefrom which can complement and slide within slot 45 of the right plate 44. The other pad 41 to the left has a flat surface without any rib thereon for engagement by a supplemental retainer plate 146 having a horizontal rib 148. The support pads 41 and 146 have appropriate apertures therethrough for reception of the clamping bolts CB with suitable retaining washers and locknuts provided for the threaded ends of the bolts. While the pair of yoke plates without the brake actuating structure tends to be somewhat flimsy, once the brake actuating mechanism is securely affixed thereto and therebetween, the entire caliper structure becomes quite solid and firm. Likewise, the left portion having the parking brake cylinder 132 is supported between support pads 41 and supplemental pads 146. Again, these pads can be provided with the ribs 241 and 148 therewith. However, pads without these strengthening ribs can be used, if desired.

Overall, the present invention comprising a plurality of yoke plates having lightening and affixing holes and slots therethrough, conventional type support pads and brake actuating mechanism, together with the improvement of quick release cam mechanism for the yoke structure and the parking brake mechanism for safe braking in static conditions offers many new and desirable features not heretofore provided.

As shown in FIGS. 5, 6, 10 and 11, the support housing 230 for the lever 62 is threaded internally thereof for screwing onto threads T externally of parking brake cylinder 130. A locking and adjusting nut 232 also is threaded upon the cylinder 130 on these same threads and provides a limit stop and lock for the parking brake housing 230. Thus, during initial assembly of the overall structure, the housing 230 can be adjusted so that lever 62 can move from non-actuated position (FIG. 5) to actuated position (FIG. 6 and FIG. 8) in a smooth and efficient manner. Once properly adjusted and set, lock nut 232 can be tightened against housing 230 to secure same in permanent position.

FIGS. 12-15 show a modified embodiment of the parking brake mechanism of the present invention. In this embodiment the parking brake is mounted on conventional cable side pull bicycle calipers. The calipers 344 and 342 are actuated by conventional cable actuating mechanism indicated generally by reference numeral 310. The lower end 345 of a caliper 344 has a conventional type brake pad BP' attached by conventional clamping structure thereto. However, the other caliper 342 has its lower end 341 enlarged for reception of the parking brake mechanism of the present invention. This mechanism is best seen in the exploded perspective of FIG. 13, and the side elevational cross-sectional view of FIG. 14 comprises a housing 330 having an enlarged head 333 at one end and a pivot lever support housing 331 at the other. Preferably, this entire housing is injection molded from plastic material in one integral unit. The inside bore of this housing preferably is in hexagon shape for reception of the hexagon shaped tube 434 therewithin. The hexagon tube 434 is preferably made of stainless steel, and has one end thereof welded to the brake pad shoe 636. The brake pad BP' is appropriately affixed by brake attaching screws BS thereto. Diametrically opposed slots 534 are provided in respective opposite sides of two of the hexagon sides. A hard plastic insert 430 is, during assembly, pressed into the open end of the hexagon tube 434. As best seen in FIG. 15, during the original making of hexagon tube 434, a plurality of indentations 534 are provided near the open end thereof. Once the hard plastic insert 430 has been inserted thereinto, natural flow of the plastic will allow sawtooth-shaped teeth 455 to be formed and engage within the plurality of recesses 534. Only one such recess can be seen in FIG. 15, but preferably a plurality of the inside ends of the hexagon faces or sides are so provided. The end of the insert 430 which extends toward lever 462 is provided with a plurality of triangular shaped ramps 436. These ramps in conjunction with the tip 465, 467 of lever 462 provide for an overcenter semi-positive locking effect. As seen in FIG. 14, the lever 462 in the non-actuated, non-braking position is shown in solid lines. When the lever is moved outwardly or to the left in FIG. 14, the tip 467 will slide up one of the triangular faces 436 and thereby force the insert 430 and the hexagon tube 434 to the right in FIG. 14 against the bias of spring 535. The spring 535 only biases the hexagon tube to the non-braking position, i.e., to the left. The spring rests between the inner face of the insert 430 and the retention pin 663. Pin 663 is across the end of housing 330 and through the slots 534 and across the hexagon tube 434.

The enlarged housing end 331 has a slot 531 provided therein for allowing the lever 462 to properly pivot about the pivot pin 463. As can best be seen in FIG. 14, the rounded surface 465 of the lever end lies against the opposite triangular slope 436 of insert 430 once the parking brake has been actuated to braking position. Thus, the bias spring 535, the triangular sloped face 436 and the cam surface 465 will maintain the parking brake in locked position until a user of the bicycle decides to actuate lever 462 and unbrake the mechanism.

While as indicated in FIGS. 12-15, the parking brake mechanism of both this embodiment and the embodiment of FIGS. 1-11 can each be used with conventional type bicycle brake structure, whether mechanical or hydraulic, it should be repeated and emphasized that either type of parking brake structure can be used with the hydraulic type of brake caliper as well as the mechanical type.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A brake device for bicycles comprising:
   a pair of brake pads for braking engagement with a bicycle wheel;
   yoke means pivotally mounted from the frame of the bicycle for operatively holding said brake pads;
   release means for permitting said yoke means to open wider than normal;
   parking brake means connected to one of said brake pads for permitting locking of the brake structure when the bicycle is stopped and/or unattended;
   said release means including an off-center cam structure for effecting said opening of said yoke means wider than normal; and
   said off-center cam structure being mounted between pairs of said yoke means so that when said cam structure is in one extended position the yoke means are opened wider than normal.

2. The brake device for bicycles of claim 1, wherein said yoke means includes a plurality of plate elements of specially configured shape.

3. The brake device for bicycles of claim 2, wherein each of said plate elements are substantially the same, and double pairs of same comprise the entire yoke structure.

4. The brake device for bicycles of claim 3, wherein lightening holes and adjusting slots are provided with each of said plate elements.

5. The brake device for bicycles of claim 1, wherein said cam structure has a lever integral therewith for manual actuation thereof when it is desired to open the yoke means wider than normal.

6. The brake device for bicycles of claim 1, wherein said parking brake means includes a manual lever for actuating one of said brake pads into wheel engagement.

7. The brake device for bicycles of claim 6, wherein said manual lever has a cam surface at one end and an off-center pivot point so that said cam surface will engage with a slidable shaft attached to said brake pad.

8. The brake device for bicycles of claim 6, wherein said brake pad is mounted on a slidable shaft, and a retraction spring for biasing same into the nonactuated position is likewise provided.

9. Braking apparatus for use with bicycles and the like comprising: caliper structure including yoke plates formed of sheet plate material which is pivotally mounted from a bicycle frame, cam structure provided between pairs of said yoke plates for effecting a wider than normal opening thereof, brake pads mounted at the respective free ends of said yoke plates, one pad being mounted on brake actuating structure under control of a rider at the handlebar of the bicycle and the other brake pad being mounted on structure for permitting engagement thereof with a bicycle wheel during a parking situation, said cam structure for opening said yoke plates wider than normal comprising a shaft having at least one off-center cam mounted on the main axis of said shaft, and said shaft being rotatably mounted between a pair of yoke plates so that when rotated said cam will effect actuation of at least one other yoke plate.

10. The braking apparatus of claim 9, wherein each of said yoke plates of sheet plate material is formed with lightening holes and adjusting slots therethrough.

11. The braking apparatus of claim 10, together with brake pad holding structure pads mounted with said adjusting slots of the yoke plates.

12. The braking apparatus of claim 10, wherein said off-center cam for opening said yoke plates wider than normal comprises said shaft having cams off-centered from the main axis of said shaft.

13. The braking apparatus of claim 12, wherein an actuating lever is provided with said cam structure.

14. The braking apparatus of claim 12, wherein said parking brake structure includes an off-center pivot lever having a cam portion at one end thereof for effecting engagement of the one brake pad during a parking situation.

15. The braking apparatus of claim 14, together with a bias spring for maintaining the braking/parking pad normally disengaged.

16. The braking apparatus of claim 9, wherein said parking brake structure includes an off-center pivot lever having a cam portion at one end thereof for effecting engagement of the one brake pad during a parking situation.

17. The braking apparatus of claim 10, wherein said parking brake structure includes an off-center lever having a cam portion at one end thereof for engagement of the one brake pad during a parking situation.

18. A brake device for bicycles comprising:
   a pair of brake pads for braking engagement with a bicycle wheel;
   yoke means pivotally mounted from the frame of the bicycle for operatively holding said brake pads;
   parking brake means connected to one of said brake pads for permitting locking of the brake structure when the bicycle is stopped and/or unattended;
   said parking brake means including a manual lever for actuating one of said brake pads into wheel engagement; and
   said manual lever having a cam element at one end, and a slidable hexogonal tube attached to said brake pad, and having an end with tapered surfaces thereon for engagement by the lever cam element.

19. A brake device for bicycles comprising:
   a pair of brake pads for braking engagement with a bicycle wheel;
   yoke means pivotally mounted from the frame of the bicycle for operatively holding said brake pads;
   parking brake means connected to one of said brake pads for permitting locking of the brake structure when the bicycle is stopped and/or unattended;
   said parking brake means including a manual lever for actuating one of said brake pads into wheel engagement; and
   said brake pad being mounted on a slidable tube, and a retraction spring for biasing same into the nonactuated position being likewise provided.

* * * * *